United States Patent
Kurihara et al.

[11] Patent Number: 5,306,538
[45] Date of Patent: Apr. 26, 1994

[54] MAGNETIC RECORDING MEDIUM HAVING A RESIN COATED BIAXIALLY ORIENTED POLYESTER SUBSTRATE

[75] Inventors: Hideshi Kurihara; Tsuyoshi Nagai, both of Sagamihara; Sadayoshi Miura, Yamato, all of Japan

[73] Assignee: Teijin Limited, Osaka, Japan

[21] Appl. No.: 852,263

[22] PCT Filed: Oct. 7, 1991

[86] PCT No.: PCT/JP91/01365
§ 371 Date: Jun. 8, 1992
§ 102(e) Date: Jun. 8, 1992

[87] PCT Pub. No.: WO92/05942
PCT Pub. Date: Apr. 16, 1992

[30] Foreign Application Priority Data

Oct. 8, 1990 [JP] Japan ............... 2-268.509
Jun. 5, 1991 [JP] Japan ............... 3-159.887

[51] Int. Cl.[5] ............................................. G11B 5/00
[52] U.S. Cl. ...................................... 428/141; 428/212; 428/323; 428/332; 428/341; 428/480; 428/481; 428/483; 428/510; 428/522; 428/694 TS; 428/694 TB; 428/694 BS; 428/694 BB; 428/694 SL; 428/694 SG

[58] Field of Search .............. 428/413, 423.7, 480, 428/481, 482, 483, 522, 524, 694, 694 TS, 694 TB, 694 BS, 694 BB, 694 SL, 694 SG, 141, 212, 323, 332, 341, 900

[56] References Cited

U.S. PATENT DOCUMENTS

| | | | |
|---|---|---|---|
| 4,153,781 | 5/1979 | Thillier et al. | 528/274 |
| 4,367,261 | 1/1983 | Miyoshi et al. | 428/330 |
| 4,552,807 | 11/1985 | Yamada et al. | 428/323 |
| 4,670,319 | 6/1987 | Katoh et al. | 428/141 |

FOREIGN PATENT DOCUMENTS 3100456 12/1981 Fed. Rep. of Germany.

*Primary Examiner*—Stevan A. Resan
*Attorney, Agent, or Firm*—Sherman and Shalloway

[57] ABSTRACT

A polyester film useful for producing a thin metallic film magnetic recording medium. The film is biaxially oriented polyester film which is composed of (1) a biaxially oriented base film of aromatic polyester prepared by use of an organotitanium compound as the polymerization catalyst, (2) a first continuous thin film which is provided on one surface of the base film and on which a thin metallic film magnetic recording layer is to be formed, (3) a second continuous thin film which is provided on the other surface of said base film to form a surface with a friction coefficient of 0.6 or less.

4 Claims, 1 Drawing Sheet

MAGNETIC RECORDING MEDIUM HAVING A RESIN COATED BIAXIALLY ORIENTED POLYESTER SUBSTRATE

TECHNICAL FIELD

This invention relates to a polyester film for a magnetic recording medium. More particularly, the invention relates to a polyester film useful in manufacture of a magnetic recording medium excelling in running properties, electromagnetic performance, storage durability, etc.

BACKGROUND ART

Ferromagnetic thin metallic film magnetic recording media in which a ferromagnetic thin metallic film is formed on a non-magnetic support, by a physical deposition method such as vacuum deposition and sputtering or by a plating method, are known. Examples thereof include magnetic tape on which Co is deposited (Japanese Laid-Open Patent Publication No. 147010/1979) and a perpendicular magnetic recording medium in which Co-Cr alloy is used (Japanese Laid-Open Patent Publication No. 134706/1977). The thin metallic film formed by such film-forming means as vacuum evaporation, sputtering or ion-plating is as extremely thin as no more than 1.5 $\mu$m. Nevertheless, it has the advantage of providing a recording medium which exhibits the performance equal to, or greater than, that of a coating type magnetic recording medium (a magnetic recording medium formed by applying a mixture of a magnetic powder and an organic polymer binder onto a non-magnetic support) whose magnetic recording layer has a thickness of no less than 3 $\mu$m.

There is a concept that magnetic properties such as coercive force Hc, which is a static property, or squareness ratio of hysteresis loop, of the magnetic recording medium do not appreciably depend on surface conditions of the non-magnetic support used. As a product embodying such a concept, U.S. Pat. No. 3,787,327 discloses a Co-Cr multi-layered structure formed by means of vacuum evaporation.

With regard to magnetic recording media with thin metallic film, however, the metallic film formed on a non-magnetic support surface is extremely thin, and the surface condition (surface unevenness) of the non-magnetic support is faithfully reflected as the surface unevenness of the magnetic recording layer. This is considered as a defect of this type of media, because the surface unevenness gives a cause of undesirable noise.

In order to eliminate noise, it is preferred that the non-magnetic support has a surface as smooth as possible. Whereas, for handling, such as winding and unwinding, of the base film, a film with smooth surface has a poor film-to-film slip property and in consequence, a blocking phenomenon occurs and such film cannot be used as a commercially acceptable product. For this reason, the base film is required to have a rough surface. Thus, from the standpoint of electromagnetic performance, the non-magnetic support is required to have a smooth surface, while from the standpoint of handling property, the surface is required to be rough. It is therefore necessary that both of those contradictory requirements are satisfied simultaneously.

Another important problem in actual use of magnetic recording media of thin metallic film type is the running property of the thin metallic film surface. With conventional coating type magnetic recording media prepared by mixing magnetic powder with an organic polymer binder and then applying the mixture onto the base film, the running property of the magnetic surface can be improved by dispersing a lubricant in the binder. However, such a means cannot be adopted with the metallic film type magnetic recording media, and it is extremely difficult to stably maintain satisfactory running property. The media have a defect that their running property is inferior, particularly under high temperature and high humidity.

For the purpose of improving this defect, Japanese Patent Publication No. 30105/1987 proposes to form fine projections on the film surface, using fine particles, a water-soluble resin and a silane coupling agent. Japanese Patent Publication No. 30106/1987 and Japanese Laid-Open Patent Publication No. 229316/1984 also propose to form fine projections on the film surface, using fine particles and a water-soluble resin. In all of those proposals, however, fine particles are present in trapezoidal projections of a water-soluble resin, and the fine particles are not uniformly present on the film surface. Whereas, Japanese Patent Publication No. 34456/1989 proposes to intimately adhere onto the film surface a non-continuous coating film of a water-soluble polymer and fine particles forming projections higher than said coating, independently of each other. The product, however, is inferior in uniformity on the film surface, because the projections are provided by the non-continuous coating film and the particles which are not uniformly dispersed.

Furthermore, Japanese Laid-Open Patent Publication No. 53815/1987 proposes to form, on a surface of polyester film on which a thin metallic film is to be formed, projections of 0.01 to 0.1 $\mu$m in diameter and 10 to 1,000 Å in height, at the number of $10^6$ to $10^9$ projections/mm$^2$; another Japanese Laid-Open Patent Publication No. 64545/1987 proposes to form, on a surface of a polyester film on which a thin metallic film is to be formed, projections of 0.2 to 2 $\mu$m in diameter and 20 to 200 Å in height at a distribution density of $10^3$ to $10^6$ projections/mm$^2$, and those of 0.01 to 0.1 $\mu$m in diameter and 10 to 1,000 Å in height, at a distribution density of $10^6$ to $10^9$ projections/mm$^2$. The polyester films described in working examples of these Japanese Laid-Open Patent Publications, however, are composed of polyesters prepared by the use of anitmony trioxide as the polymerization catalyst and have a surface defect considered to be attributable to the antimony trioxide. As an attempt to overcome such defect, the International Laid-Open Publication WO 88/08437 proposes to use a germanium compound as the polymerization catalyst, however, without yet achieving sufficient effect.

DISCLOSURE OF THE INVENTION

An object of the present invention is to provide a polyester film for use in a magnetic recording medium.

Another object of the present invention is to provide a polyester film useful for manufacture of a magnetic recording medium, particularly a thin metallic film magnetic recording medium, which is free from the drawbacks in conventional technology and excelling in running property, electromagnetic performance, etc.

Still other objects and advantages of the invention will become apparent from the following description.

According to the present invention, the above objects and advantages are to provide a biaxially oriented polyester film for use in a magnetic recording medium, which is composed of:

(1) a biaxially oriented base film of an aromatic polyester which is prepared by use of an organotitanium compound as the polymerization catalyst, (2) a first continuous thin film provided on one of the surfaces of said base film, on which a magnetic recording layer is to be formed, said first continuous thin film being composed of a composition consisting mainly of (A1) a first binder resin, and (B1) first fine particles having an average particle diameter of not greater than 0.1 $\mu$m, and having on its surface (C1) fine projections derived from said first fine particles at the number of $1.0 \times 10^4$ to $1.0 \times 10^9$ projections/mm$^2$, and the surface roughness of the film being 0.001 to 0.01 $\mu$m in terms of center line average roughness, and (3) a second continuous thin film provided on the other surface of said base film, which forms slippery surface, said second continuous thin film being composed of a composition consisting mainly of (A2) a second binder resin, (A3) a cellulosic resin, and (B2) second fine particles having an average particle diameter of not greater than 0.15 $\mu$m, and having (C2) a surface roughness of 0.002 to 0.01 $\mu$m in terms of center line average roughness.

DETAILED DESCRIPTION OF THE INVENTION

Figure 1:
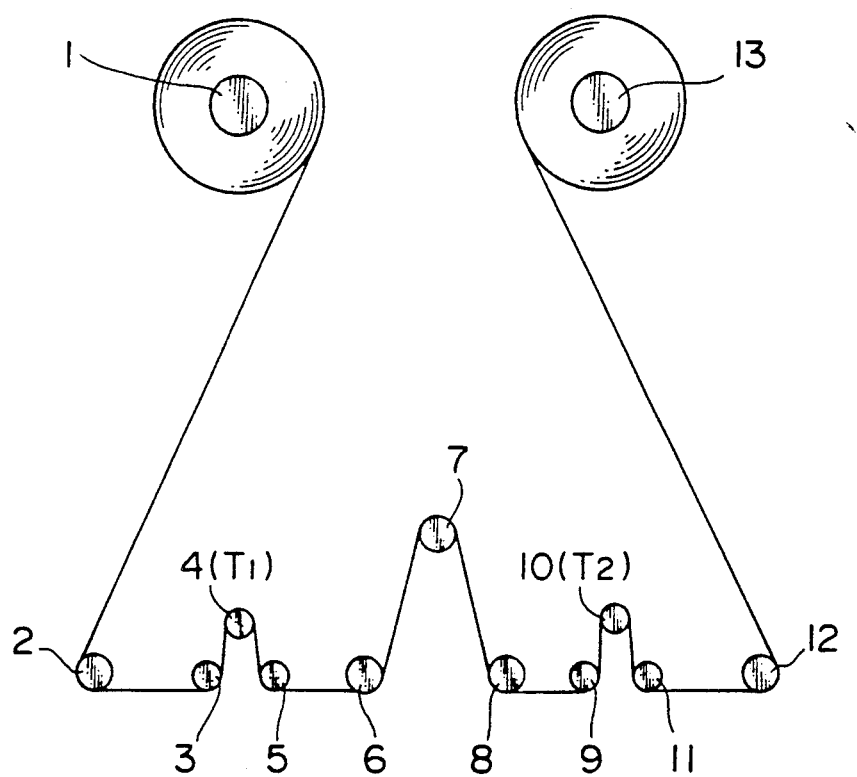
FIG. 1 is a schematic view of the device for measuring the dynamic friction coefficient for evaluation of running properties of sample films.

Preferred aromatic polyester constituting the film of this invention is a linear, saturated polyester which is synthesized from an aromatic dibasic acid or its ester-forming derivative and an aliphatic diol or its ester-forming derivative. Specific examples of the preferred aromatic polyester include polyethylene terephthalate, polyethylene isophthalate, polytetramethylene terephthalate, poly(1,4-cyclohexylene dimethylene terephthalate), polyethylene-2,6-naphthalene dicarboxylate, copolymers composed of the recurring units of the homopolyesters themselves or of the recurring units of these homopolyesters and other recurring units, and blends of these with a minor amount of other resin or resins.

These aromatic polyesters can be prepared by any of the known methods per se. For example, polyethylene terephthalate can be obtained through an esterification reaction of terephthalic acid and ethylene glycol or an ester-interchange reaction of dimethyl terephthalate and ethylene glycol, each followed by polycondensation of the reaction product. In this case, an organotitanium compound is used as the polycondensation catalyst to secure favorable film characteristics, although any other known catalysts may be used.

As the organotitanium compounds, for example those described in Japanese Laid-Open Patent Publication No. 278927/1988 are preferably used. That is, alcoholates or organic acid salts of titanium and reaction products of tetraalkyl titanates with aromatic polyvalent carboxylic acids or their anhydrides may be used. Particularly, preferred specific examples include titanium tetrabutoxide, titanium isopropoxide, titanium oxalate, titanium acetate, titanium benzoate, titanium trimellisate, a reaction product of tetrabutyl titanate and trimellitic anhydride or the like. Such an organotitanium compound is preferably used in a proportion of 3 to 10 millimole % of titanium atoms based on the polyester-constituting acid component.

The aromatic polyester may optionally contain known surface-roughening particles which cause formation of projections on the film surface, e.g., those of calcium carbonate, kaolinite, titanium dioxide, silica, alumina or the like, and other additives, in an amount not detrimental to the purpose of the present invention.

The aromatic polyester is formed into a biaxially oriented film through the steps of melt-extrusion, biaxial stretching and orientation and heat-setting by the means known per se. The biaxial stretching can be carried out by, for example, a consecutive or simultaneous biaxial stretching method. The resultant biaxially oriented polyester film preferably has a crystal orientation property to render the heat of fusion at least 4 cal/g, when the heat of fusion is determined with a differential scanning calorimeter in nitrogen atmosphere at a temperature rise rate of 10° C./min. The stretched and oriented film preferably has a thickness ranging from 3 to 100 $\mu$m, more preferably from 4 to 50 $\mu$m.

The biaxially oriented polyester film of the present invention has continuous thin films provided on both surfaces of the base film. The first thin film layer on which a magnetic recording layer, particularly a ferromagnetic, thin metallic film layer, is to be formed, is composed of a composition consisting mainly of (A1) a first binder resin and (B1) fine particles (surface-roughening material) of an average particle diameter of not greater than 0.1 $\mu$m. On the surface of the first thin film, projections derived from above (B1) component are formed at the number of $1.0 \times 10^4$ to $10^9$ projections/mm$^2$, and the surface roughness of the film is 0.001 to 0.01 $\mu$m, when expressed in terms of a center line average roughness. The second thin film which affords good slip characteristics to the surface is composed of a composition consisting mainly of (A2) a second binder resin, (A3) a cellulosic resin and (B2) fine particles (surface-roughening material) having an average particle diameter of not greater than 0.15 $\mu$m. The surface roughness of said second thin film is required to be 0.002 to 0.01 $\mu$m in terms of a center line average roughness. When the number of projections on the surface of the first film and the surface roughness satisfy the conditions of (1) above, noise is drastically reduced particularly in case of a thin metallic film magnetic recording medium. Consequently, the noise level becomes markedly excellent, and the running property of the thin metallic film surface also is very satisfactory. Furthermore, when the second film surface satisfies the above requirements, its surface properties are not reflected on the first thin film layer, and the film exhibits excellent slip characteristic.

Examples of the first binder resin (A1) used for the first thin film include alkyd resin, unsaturated polyester resin, saturated polyester resin, phenolic resin, epoxy resin, amino resin, polyurethane resin, vinyl acetate resin, vinyl chloride-vinyl acetate copolymer resin, acrylic resin and acryl-polyester resin. Those resins can be used either singly or in combination of two or more.

Of the above resins, saturated polyester resin, acrylic resin and acryl-polyester resin are preferred, acryl-polyester resin being especially preferred.

These first binder resins are known per se.

For instance, examples of the acrylic resins are those prepared by polymerization or copolymerization of the following monomers, either singly or in combination: acrylates (preferred alcohol residues are methyl, ethyl, n-propyl, isopropyl, n-butyl, isobutyl, t-butyl, 2-ethylhexyl, cyclohexyl, phenyl, benzyl, phenylethyl groups, etc.); methacrylates (preferred alcohol residues are same as above); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-methylmethacrylamide, N-methylacrylamide, N-methylolacrylamide, N-methylolmethacrylamkde, N,N-dimethylolacrylamide, N-methoxymethylacrylamide, N-methoxymethylmethacrylamide and N-phenylacrylamide; amino group-containing monomers such as N,N-diethylaminoethyl acrylate and N,N-diethylaminoethyl methacrylate; epoxy group-containing monomers such as glycidyl acrylate, glycidyl methacrylate and allyl glycidylether; monomers containing sulfonic acid group or a salt thereof, such as styrenesulfonic acid, vinylsulfonic acid and their salts (e.g., sodium salts, potassium salts, ammonium salts, etc.); monomers containing carboxylic acid group or a salt thereof, such as crotonic acid, itaconic acid, acrylic acid, maleic acid, fumaric acid and their salts (e.g., sodium salts, potassium salts, ammonium salts, etc.); anhydride-containing monomers such as maleic acid anhydride and itaconic acid anhydride; and other monomers such as vinyl isocyanate, allyl isocyanate, styrene, vinyl methyl ether, vinyl ethyl ether, vinyl tris-alkoxysilane, alkyl monomaleate, alkyl monofumarate, acrylonitrile, methacrylonitrile, alkyl monoitaconate, vinylidene chloride, vinyl acetate and vinyl chloride, etc. The resins containing at least 50 mol % of acrylic or methacrylic monomer component are preferred. The resins containing methyl methacrylate component are particularly preferred.

Such acrylic resins can self-crosslink via intramolecular functional group(s). Or, they may also be crosslinked using a crosslinking agent such as a melamine resin or an epoxy compound.

As the acid component constituting the polyester resin (A1) used for the first thin resin film, polyvalent carboxylic acids such as terephthalic, isophthalic, phthalic, 1,4-cyclohexanedicarboxylic, 2,6-naphthalenedicarboxylic, 4,4'-diphenyldicarboxylic, adipic, sebacic, dodecanedicarboxylic, succinic, 5-sodium sulfoisophthalic, 2-potassium sulfoterephthalic, trimellitic and trimesic acids, trimellitic anhydride, phthalic anhydride, p-hydroxybenzoic acid and monopotassium salt of trimellitic acid can be used. As the hydroxy compound component, for example, the following polyvalent hydroxy compounds may be used: ethylene glycol, propylene glycol, 1,3-propanediol, 1,4-butanediol, 1,6-hexanediol, neopentyl glycol, 1,4-cyclohexane dimethanol, p-xylylene glycol, ethylene oxide adduct of bis-phenol A, diethylene glycol, triethylene glycol, polyethylene oxide glycol, polytetramethyleneoxide glycol, dimethylolpropionic acid, glycerine, trimethylolpropane, sodium dimethylolethyl sulfonate and potassium dimethylolpropionate. Polyester resins can be formed from these polyvalent carboxylic acids and hydroxy compounds by the means known per se. When preparation of an aqueous coating liquid is intended, use of a polyester resin containing 5-sodium sulfoisophthalic acid component or a carboxylate group is preferred. Such polyester resins can be made self-crosslinking type having intramolecular functional groups, or may be crosslinked using a curing agent such as a melamine resin or an epoxy resin.

The acryl-polyester resins serving as the resins (A1) to form the first thin film include acryl-modified polyester resins and polyester-modified acrylic resins in which an acrylic resin component and polyester resin component are mutually bound, for example, as grafted or as blocks. The acryl-polyester resins can be prepared, for example, by adding a radical initiator to both terminals of a polyester resin and carrying out polymerization of an acrylic monomer; by adding a radical initiator to side chains of a polyester resin and carrying out polymerization of an acrylic monomer; or by bonding hydroxyl groups to side chains of an acrylic resin and forming a comb-shaped polymer through the reaction thereof with a polyester having isocyanate or carboxyl terminal groups.

As the first fine particles (B1) constituting the first thin film, either organic or inorganic fine particles can be used. Examples of the former include fine particles of polystyrene, polymethyl methacrylate, methyl methacrylate copolymer, crosslinked product of methyl methacrylate copolymer, polytetrafluoromethylene, polyvinylidene fluoride, polyacrylonitrile and benzoguanamine resin; and examples of the latter include those of silica, alumina, titanium dioxide, kaolinite, talc, graphite, calcium carbonate, feldspar, molybdenum disulfide, carbon black and barium sulfate. They are used in a form of an aqueous dispersion prepared by use of an emulsifying agent, or in their fine particulate form allowing addition to an aqueous liquid.

The first fine particles (B1) have a size of not greater than 0.1 $\mu$m, preferably in the range of 0.005 to 0.05 $\mu$m, in terms of average particle diameter.

The first thin film is composed mainly of the first binder resin (A1) and the first fine particles (B1), and the former makes up preferably 45 to 99.9% by weight and the latter, 0.1 to 55% by weight, based on the total weight of these components.

When the first fine particles are present in too small an amount, the prescribed number of projections cannot be formed on the thin film uniformly. Whereas, when they are present in an excessive amount, their dispersibility is impaired, rendering it difficult to impart the projections uniformly at the prescribed number. When the amount of the first binder resin is too little, the intimate adhesion of the thin film to the polyester base film is impaired, while presence of an excessive amount of said resin deteriorates blocking resistance of the film.

Methods for forming the first thin film provided with fine projections derived from the first fine particles on the surface of the polyester base film include: a method in which a coating solution of the first binder resin containing the first fine particles, preferably an aqueous coating solution, is applied onto a film surface during preparation of the biaxially oriented polyester film, and is dried to solidify; or, a method in which a coating solution of the first binder resin containing the first fine particles is applied onto a surface of the biaxially oriented film, and is dried to solidify. The former method is the preferred.

Explaining the former method in further details, it is preferred that an aqueous coating solution is applied to a surface of the polyester film, for example, before completion of the procedure of its orientation and crystallization.

Here "the polyester film before completion of orientation and crystallization" includes an as-hot melt-extruded, not yet stretched film; a monoaxially stretched film formed by drawing the non-stretched film in either one of the longitudinal and transverse directions; and a biaxially stretched film which has been stretched biaxially but stretched by a low ratio in at least one of these directions and needs to be further stretched in said direction (a biaxially stretched film before finally re-stretched in the longitudinal and/or transverse direction to complete the orientation and crystallization).

The film of the present invention is preferably prepared by a method generally referred to as in-line coating process, viz., by the steps of applying an aqueous coating solution of aforesaid composition to the un-stretched film or at least monoaxially drawn film before orientation and crystallization is completed, stretching the film longitudinally and/or transversely and heat-setting the same. In that occasion, in order to attain smooth formation of a coating film on the surface of the polyester film whose orientation and crystallization of molecules is yet incomplete, it is preferred either to subject the film surface to a corona discharge treatment as a preliminary treatment or to use, concurrently with the coating composition, a surface-active agent which is chemically inert to said composition. Such a surfactant can reduce surface tension of the aqueous coating solution to 40 dyne/cm or less thereby to promote wetting of the polyester film. For example, anionic or nonionic surfactants such as polyoxyethylene alkylphenyl ether, polyoxyethylene fatty acid ester, sorbitan fatty acid ester, glycerine fatty acid ester, fatty acid metallic soap, alkyl sulfate, alkyl sulfonate and alkyl sulfosuccinate, etc. are conveniently used. Furthermore, within the scope of not lessening the effects of the present invention, other additives such as an antistatic agent, ultraviolet ray-absorbing agent, lubricant, etc. may be incorporated into the composition.

In the present invention, preferred solid concentration in the coating solution, particularly aqueous coating solution, is usually not higher than 30% by weight, more preferably not higher than 15% by weight. The solid concentration is preferably not lower than 0.5% by weight. Its viscosity is generally not higher than 100 centipoises (cps), preferably not higher than 20 cps. The coating amount is about 0.5 to 20 g, preferably about 1 to 10 g, per 1 m² of the running film. In other words, one surface of the finally-obtained biaxially oriented film preferably comes to have about 0.001 to 1 g, more preferably about 0.005 to 0.3 g/m² as the solid concentration.

Any of known coating methods can be optionally employed. For instance, roll coating, gravure coating, roll brushing, spray coating, air knife coating, impregnation, curtain coating, etc. can be employed either singly or in combination.

The first thin film has on its surface fine projections derived from the first fine particles at the number of $1.0 \times 10^4$ to $1.0 \times 10^9$ projections/mm², preferably $1.0 \times 10^4$ to $1.0 \times 10^8$ projections/mm².

Further, the surface roughness of the first thin film is 0.001 to 0.01 $\mu$m, preferably 0.001 to 0.004 $\mu$m, in terms of the center line average roughness.

The first thin film has on its surface, besides the fine projections derived from the first particles (B1), fine projections formed of the first binder (A1) alone at the number not higher than $4.0 \times 10^6$ projections/mm², preferably not higher than $4.0 \times 10^5$ projections/mm².

The biaxially oriented polyester film of the present invention for magnetic recording medium has, on the surface other than the one coated with the first thin film, a second thin film forming a slippery surface, which is different from the first thin film.

As preferred examples of the second binder resin (A2) used for the second thin film, mention can be made of those given as to the first binder resin (A1). The second binder resin may be same as, or different from, the first binder resin.

The second thin film contains a cellulosic resin (A3).

Preferred examples of the cellulosic resin include ethyl cellulose, methyl cellulose, acetyl cellulose, acetoacetyl cellulose, nitrocellulose, carboxylated cellulose, carboxymethyl cellulose, cellulose acetate butylate, etc. Use of the cellulosic resin allows formation of numerous fine pleats on the film surface.

Examples of the second fine particles (B2) in the second thin film are identical to those used as the first fine particles. The upper limit of the average particle diameter of the second fine particles (B2) is 0.15 $\mu$m, greater than that (0.1 $\mu$m) of the first fine particles (B1). The second fine particles preferably have an average particle diameter of 0.01 to 0.1 $\mu$m.

The quantitative ratios of the second binder resin (A2), cellulosic resin (A3) and second fine particles (B2) in the second thin film which forms a slippery surface, based on the total weight of those three components, are as follows: the second binder resin, preferably 30 to 85% by weight, more preferably 40 to 70% by weight; cellulosic resin, preferably 10 to 50% by weight, more preferably 15 to 40% by weight; and the second fine particles, preferable 5 to 30% by weight, more preferably 7 to 20% by weight.

When the amount of the second binder resing is too little, intimate adhesion of the thin film to the polyester film is impaired, while when it is too much, blocking resistance and slip characteristic of the film are deteriorated. An excessively low cellulosic resin content reduces the pleats in the film to impair processing property, while excessive presence of said resin renders the film surface objectionably coarse. Too little amount of the second fine particles impairs good slip characteristic of the film, while their excessive presence causes them to easily fall off from the thin film.

The second thin film having the fine projections derived from the second particles can be formed on the polyester base film in the same manner as described about the formation of the first thin film.

The second thin film has a surface roughness of 0.002 to 0.01 $\mu$m, preferably 0.003 to 0.009 $\mu$m, as expressed in terms of center line average roughness.

According to a preferred production process in the present invention, the coating solutions for forming the first and second thin films are applied to the base film immediately after it has been monoaxially stretched in the longitudinal direction. The film is then introduced to a tenter for transverse stretching and heat-setting. In that occasion, the coating in yet unsolidified state is enlarged in area as the film is stretched, and its water content is evaporated under heating. The applied solutions are thus converted to thin, solid and continuous coating layers on the biaxially stretched film surfaces and firmly fixed onto the surface. The stretching and heating treatments are preferably conducted at temperatures from about 80° C. to about 240° C. The heat-treatment is usually performed for about 1 to about 20 seconds.

The orientation and crystallization conditions of the polyester film, e.g., stretching and heat-setting conditions, may be those conventionally known to the art.

Manufacture of a thin metallic film magnetic recording medium using the polyester film of the present invention can be conducted by the known methods per se, e.g., those taught in Japanese Laid-Open Patent Publications Nos. 147010/1979 and 134706/1977. More specifically, they can be preferably manufactured through vacuum evaporation, ion plating or sputtering method.

The polyester film of the present invention allows formation of smooth, magnetic layer, particularly thin metallic film magnetic layer, excelling in running property and storage durability and enables drastic reduction in noise. Therefore, this film is useful for manufacture of a magnetic recording medium, particularly thin metallic film magnetic recording medium, with remarkably excellent noise level and excellent running property exhibited by the magnetic surface, particularly the thin metallic surface.

The various properties referred to in the present specification are measured as follows.

(1) Inherent viscosity [$\eta$]

It is determined from the value measured in orthochlorophenol solvent at 35° C.

(2) Average particle diameter

It is indicated by "equivalent spherical diameter" of the particle present at the point of 50% by weight of total particles determined by photo-transmission type centrifugal sedimentation method.

(3) Number of projections

The projection counts on film surface is conducted by a scanning electron microscope. The fine projections containing the fine particles as their kernels are counted under a magnification of 20,000 to 50,000×, and the projections of a binder resin alone are counted under a magnification of 10,000 to 20,000×.

(4) Surface roughness

Ra (Center Line Average Roughness)

Following JIS B0601 and using a High Precision Surface Roughness Meter SE-3 FAT of Kosaka Laboratories Co., Ltd, a chart is drawn under the conditions of: stylus radius, 2 μm; load, 30 mg; magnification, 200,000×; and cut-off, 0.08 mm. From the film surface roughness curve, a portion of a measured length L in the direction of its center line is extracted, and when the roughness curve is expressed as Y=f(x), taking the center line of this extracted portion as X axis and the direction of its vertical magnification, as Y axis, the value (Ra) given by the equation below is presented by the unit of μm.

$$Ra = \frac{1}{L}\int_0^L |f(x)|dx$$

The measurement is made as to four samples with a standard length of 1.25 mm, and the average of the four values is adopted as the center line average roughens of the sample film,.

(5) Frictional coefficient (film slipperiness)

Following ASTM D 1894-63, a slipperiness meter manufactured by Toyo Tester K.K. is used to measure static frictional coefficient ($\mu s$) of the sample film. A glass sheet is used as the sled and the load is 1 kg.

Slipperiness of a film is evaluated according to the following three-grade system:
○: good ($\mu s$=less than 0.6)
Δ: inferior ($\mu s$=0.6 to 0.8)
X: poor ($\mu s$=more than 0.8).

(6) Running durability

FIG. 1 shows a schematic view of the device for evaluating film running property. In the drawing, 1 is a supply reel; 2 is a tension controller; 3, 5, 6, 8, 9 and 11 are free rollers; 4 is a tension detector (inlet); 7 is a chrome-plated fixed pin (5 mm$\phi$); 10 is a tension detector (outlet); 12 is a guide roller and 13 is a take-up reel.

As shown in FIG. 1, in an atmosphere of 20° C. and 60% RH, a sample film is contacted with the fixed pin of 5 mm in outer diameter at an angle $\theta=(152/180)\pi$ radian (152°), and frictionally moved at a rate of 3.3 cm/sec. The tension ($T_1$) at the inlet is adjusted to 30 g with the tension controller 2. The film is so run for 10 meters, re-wound and run repeatedly. Each one cycle of this reciprocating running is counted as one running.

(1) Abrasion resistance

After 30 times of repetitive running, the presence of accumulation of scraped substance on the fixed pin is observed, and abrasion resistance is evaluated by a three-grade system as follows:
○: accumulation is scarcely observed
Δ: minor accumulation is observed
X: substantial accumulation is observed.

(2) Scratch resistance

After 30 times of repetitive running, the friction condition of the film surface (scratches formed on the surface) is observed and the scratch resistance is evaluated by a two-grade system as follows:
○: scratches are scarcely observed
X: considerably many scratches are observed.

(7) Electromagnetic performance

High-density recording characteristics, particularly the noise level, is evaluated by S/N (dB) ratio at the time of 10 KBPI record regeneration and by drop ratio in output in an occasion of 50 KBPI record regeneration to that in 10 KBPI record regeneration:
S/N (dB) at 10 KBPI record regeneration;
○: at least 40 dB
X: less than 40 dB
Output drop ratio;
A=(output at the time of 10 KBPI record regeneration)/(output at the time of 50 KBPI)
○: A is less than 10
X: A is 10 or more.

(8) Running property of tape

Using ordinary commercially available 8 mm VTR, recording and playing-back are repeated, and fluctuation of picture caused by tape running disorder is observed. The norms of evaluation are as follows.

○: smooth running and no fluctuation in regenerated pictures
X: running is retarded occasionally, resulting in fluctuation of regenerated pictures.

(9) Scratch resistance (adhesion)

After 100 times of repetitive running each under normal temperature and humidity conditions and high temperature and humidity conditions, scratches on the thin films of the sample tapes are examined. The evaluation standards are as follows:
⊚: almost no scratch is found in the thin film surface of the tape
○: a few, very faint scratches are observed in the thin film surface of the tape
X: distinct scratches are formed in the thin film surface of the tape.

The normal temperature and humidity signify 25° C. and 60% RH, and high temperature and humidity, 40° C. and 80% RH, respectively.

EXAMPLES

The invention will be further explained with reference to the following working examples, in which "part" is part by weight.

Example 1

A reactor was charged with 100 parts of dimethyl terephthalate, 70 parts of ethylene glycol, 0.019 part of manganese acetate tetrahydrate and 0.013 part of sodium acetate trihydrate. An ester-interchange reaction was carried out in the reactor whose internal temperature was gradually raised from 145° C. When the ester-interchange reaction ratio reached 95%, there was added 0.044 part of a glycol solution of a phosphorus compound as a stabilizer, which solution was separately in advance prepared by reacting 25 parts of trimethyl phosphate with 75 parts of ethylene glycol in a closed system under reflux for 5 hours and subsequently cooling the reaction product to room temperature. 0.011 Part of a solution (containing 11% by weight of titanium) was further added thereto as a polymerization catalyst, said solution having been prepared through a reaction of 0.8 part of trimellitic anhydride with 0.65 part of tetrabutyl titanate in 2.5 parts of ethylene glycol for 60 minutes in air under normal pressure and subsequent cooling of the system to normal temperature. Thereafter, the reaction product was transferred to a polymerization vessel and polycondensed under high temperature in vacuo (the final internal temperature of the vessel: 290° C.) to provide a polyethylene terephthalate having an inherent viscosity of 0.60.

The polyethylene terephthalate was melt-extruded and rapidly cooled in an accepted manner to obtain an unstretched film of 131 μm in thickness. The film was then consecutively biaxially stretched by 3.6× in the longitudinal direction at 90° C. and by 3.7× in the transverse direction at 105° C., followed by 30 seconds of heat-setting at 205° C. Thus, a biaxially oriented film of 9.8 μm in thickness was prepared. In that occasion, to the monoaxially stretched film before the transverse stretching, a coating solution having the following composition was applied onto the upper surface (A) and back surface (B) by roll coating method. The surface (A) is the one on which the first thin film is to be formed, and on the surface (B) the second thin film (slippery surface) is to be formed.

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 80.8 parts |
| 1.5 wt % solution of poly(methyl methacrylate) fine particles ("Epostar MA" produced by Nippon Shokubai Co., Ltd) (The average diameter of the fine particles was 0.03 μm.) | 4.2 parts |
| 1.5 wt % solution of polyoxyethylene nonyl phenyl ether ("NS 240" produced by Nippon Oils and Fats Co., Ltd) | 15.0 parts |

The application rate of the coating composition was 2.7 g/m² on wet basis.

Composition of the coating solution applied onto the film surface (B):

| | |
|---|---|
| 2.0 wt % solution of acryl-polyester resin ("Pesresin SH 551" produced by Takamatsu Oil & Fat Co., Ltd) | 56.7 parts |
| 2.0 wt % solution of cellulosic resin ("Methyl Cellulose SM-15" produced by Shin-etsu Chemical Co., Ltd) | 24.3 parts |
| 2.0 wt % solution of poly(methyl methacrylate) fine particles ("Epostar MA" produced by Nippon Shokubai Co., Ltd) (The average diameter of the fine particles was 0.03 μm.) | 9.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

Properties of the resulting polyester film and the magnetic recording medium prepared by providing a magnetic layer on the first thin film of the above film are shown in Table 1.

Example 2

Example 1 was repeated except that 0.145 part of an ethylene glycol slurry of silicon dioxide having 0.10 μm in average diameter (10 wt % of silicon dioxide/ethylene glycol slurry) was added when the internal temperature in the ester-interchange reaction reached 190° C. The properties of the resultant polyester film and the magnetic recording medium prepared therefrom are shown in Table 1.

Example 3

Example 2 was repeated except that 0.145 part of the ethylene glycol slurry of silicon dioxide having an average particle diameter of 0.10 μm was replaced by 0.074 part of an ethylene glycol slurry of silicon dioxide having 0.08 μm in average particle diameter (10 wt % of silicon dioxide/ethylene glycol slurry). The properties of the resultant polyester film and the magnetic recording medium prepared therefrom are shown in Table 1.

Example 4

Example 1 was repeated except that the composition of the coating solution applied onto the film surface (A) was changed as follows:

| | |
|---|---|
| 0.7 wt % solution of acryl-polyester resin ("Pesresin SH 551" produced by Takamatsu Oil & Fat Co., Ltd) | 74.3 parts |

-continued

| | |
|---|---|
| 0.7 wt % solution of poly(methyl methacrylate) fine particles ("Epostar MA" produced by Nippon Shokubai Co., Ltd) (The average diameter of the fine particles was 0.25 μm.) | 5.5 parts |
| 0.7 wt % solution of tetrabutyl phosphonium dodecylbenzene sulfonate (produced by Takemoto Oil & Fat Co., Ltd) | 0.2 part |
| 0.7 wt % solution of polyoxyethylene nonyl phenyl ether ("NS 240" produced by Nippon Oils and Fats Co., Ltd) | 20.0 parts |

The application rate of the coating composition was 2.2 g/m² on wet basis.

Furthermore, in the preparation of biaxially oriented film, an unstretched film of 140 μm in thickness was prepared, followed by consecutive biaxial stretching treatment comprising 3.2× longitudinal stretching at 90° C. and 4.3× transverse stretching at 105° C. The stretched film was heat-set for 30 seconds at 215° C., to provide a biaxially oriented film of 10.2 μm in thickness.

The properties of the polyester film so obtained and the magnetic recording medium prepared therefrom are shown in Table 1.

Example 5

Example 4 was repeated except that 0.125 part of an ethylene glycol slurry of silicon dioxide having an average particle diameter of 0.05 μm (10 wt % of silicon dioxide/ethylene glycol slurry) was added when the internal temperature in the ester-interchange reaction reached 190° C. The properties of the resultant polyester film and the magnetic recording medium prepared therefrom are shown in Table 1.

Example 6

Example 2 was repeated except that 0.013 part of sodium acetate trihydrate to be added to the ester-interchange reaction system was changed to 0.0092 part of potassium acetate. The properties of the resultant polyester film and the magnetic recording medium prepared therefrom are shown in Table 1.

Example 7

A mixture of 100 parts of bis-β-hydroxyethyl terephthalate, 65 parts of terephthalic acid and 29 parts of ethylene glycol was subjected to an esterification reaction at 210° to 230° C. At the point when the amount of distilled water formed in the reaction reached 13 parts, the reaction was terminated, and 0.0067 part of titanium acetate per 100 parts of the reaction product was added to the system. Then the reaction product was transferred to a polymerization vessel. Through subsequent polycondensation reaction under high temperature in vacuo (final internal temperature: 285° C.), a polyethylene terephthalate having an inherent viscosity of 0.60 was obtained.

This polyethylene terephthalate was melt-extruded and rapidly cooled to form an unstretched film of 131 μm in thickness in the accepted manner, which film was then consecutively biaxially stretched by 3.6× in the longitudinal direction at 90° C. and by 3.7× in the transverse direction at 105° C., followed by 30 seconds of heat-setting at 205° C. Thus, a biaxially oriented film of 9.8 μm in thickness was prepared. In that occasion, to the monoaxially stretched film before the transverse stretching, a coating solution having the following composition was applied onto its surfaces (A) and (B) by roll coating method. The surface (A) is the one on which the first thin film is to be formed, and on the other surface (B) the second thin film (slippery surface) is to be formed.

Composition of the coating solution applied onto the film surface (A):

| | |
|---|---|
| 1.5 wt % solution of acryl-polyester resin "Pesresin SH 416" produced by Takamatsu Oil & Fat Co., Ltd) | 82.5 parts |
| 1.5 wt % solution of colloidal silica ("Cataloid-SI 350" produced by Catalysts & Chemicals Industries Co., Ltd) | 2.5 parts |
| 1.5 wt % solution of polyoxyethylene nonyl phenyl ether ("NS 240" produced by Nippon Oils and Fats Co., Ltd) | 15.0 parts |

The application rate of the coating composition was 2.9 g/m² on wet basis.

Composition of the coating solution applied onto the film surface (B):

| | |
|---|---|
| 2.0 wt % solution of acryl-polyester resin ("Pesresin SH 416" produced by Takamatsu Oil & Fat Co., Ltd) | 54.7 parts |
| 2.0 wt % solution of cellulosic resin (hydroxypropylmethylcellulose "TC-5" produced by Shin-etsu Chemical Co. Ltd) | 24.3 parts |
| 2.0 wt % solution of colloidal silica ("Cataloid-SI-30" produced by Catalysts & Chemicals Industries Co., Ltd) | 11.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.3 g/m² on wet basis.

The properties of the resultant polyester film of the magnetic recording medium prepared by providing a magnetic layer on the first surface of the above film are shown in Table 1.

Example 8

To a mixture of 100 parts of dimethyl-2,6-naphthalene dicarboxylate and 60 parts of ethylene glycol, 0.021 part of manganese salicylate and 0.005 part of potassium acetate were added. After further addition of 0.007 part of titanium oxalate, an ester-interchange reaction was carried out, while the temperature was raised gradually from 150° C. to 240° C. When the ester-interchange reaction ratio reached 92%, 0.032 part of a liquid mixture having a liquid temperature of 140° C. was added as a stabilizer, said liquid mixture having been prepared by an advance and separate reaction of 25 parts of trimethyl phosphate with 75 parts of ethylene glycol in a closed system under reflux for 5 hours. Then, the reaction product was transferred into a polymerization vessel, where polycondensation of the system was carried out under high temperature in vacuo (final inside temperature: 280° C.) to obtain a polyethylene-2,6-naphthalate having an inherent viscosity of 0.57.

This polyethylene-2,6-naphthalate was melt-extruded and rapidly cooled in the accepted manner to form an unstretched film of 60 μm in thickness, which was consecutively biaxially stretched by 4.0× in the longitudinal direction at 135° C. and by 3.8× in the transverse direction at 145° C., followed by 30 seconds of heat-setting at 210° C. Thus, a biaxially oriented film of 4.0 μm in thickness was prepared. In that occasion, to the monoaxially stretched film before the transverse stretching, a coating solution of the following composition was applied onto the film surfaces (A) and (B) by roll coating method. The surface (A) is the one on which the first thin film is to be formed, and on the surface (B) the second thin film (slippery surface) is to be formed.

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 80.8 parts |
| 1.5 wt % solution of poly(methyl methacrylate) fine particles ("Epostar MA" produced by Nippon Shokubai Co., Ltd) (The average diameter of the fine particles was 0.03 μm.) | 4.2 parts |
| 1.5 wt % solution of polyoxyethylene nonyl phenyl ether ("NS 240" produced by Nippon Oils and Fats Co., Ltd) | 15.0 parts |

The application rate of the coating composition was 2.4 g/m² on wet basis.

Composition of the coating solution applied onto the film surface (B):

| | |
|---|---|
| 2.0 wt % solution of acryl-polyester resin ("Pesresin SH 551" produced by Takamatsu Oil & Fat Co., Ltd) | 52.7 parts |
| 2.0 wt % solution of cellulosic resin ("SM-15" produced by Sin-etsu Chemical Co., Ltd) | 24.3 parts |
| 2.0 wt % solution of poly(methyl methacrylate) fine particles ("Epostar MA" produced by Nippon Shokubai Co., Ltd) (The average diameter of the fine particles was 0.05 μm.) | 13.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 3.5 g/m² on wet basis.

The properties of the formed polyester film and the magnetic recording medium prepared by providing a magnetic layer on its first surface are shown in Table 1.

Example 9

Example 2 was repeated except that the compositions of the coating solutions to be applied to the film surfaces (A) and (B) were changed to the following.

Composition of the coating solution applied onto the film surface (A):

| | |
|---|---|
| 1.5 wt % solution of polyester resin ("Plascoat Z-461" produced by Gooh Chemical Ind. Co., Ltd. Co.) | 41 parts |
| 1.5 wt % solution of acrylic resin ("Primal AC-61" produced by Nihon Acryl Chemical Co., Ltd) | 38.3 parts |
| 1.5 wt % solution of colloidal silica ("Cataloid-SI 350" produced by Catalysts & Chemicals Industries Co., Ltd) | 5.7 parts |
| 1.5 wt % solution of polyoxyethylene nonyl phenyl ether ("NS 208.5" produced by Nippon Oils and Fats Co., Ltd) | 15.0 parts |

The application rate of the coating composition was 2.0 g/m² on wet basis.

Composition of the coating solution applied onto the film surface (B):

| | |
|---|---|
| 2.5 wt % solution of polyester resin "Plascoat Z-416" produced by Gooh Chemical Ind. Co., Ltd) | 30.0 parts |
| 2.5 wt % solution of acrylic resin ("Primal AC-61" produced by Nihon Acryl Chemical Co., Ltd) | 20.0 parts |
| 2.5 wt % solution of cellulosic resin ("HPC-SL" produced by Nippon Soda Co., Ltd) | 20.0 parts |
| 2.5 wt % solution of colloidal silica ("Cataloid-SI-30" produced by Catalysts & Chemicals Industries Co., Ltd) | 15.0 parts |
| 2.5 wt % solution of polyoxyethylene nonyl phenyl ether ("NS 240" produced by Nippon Oils and Fats Co., Ltd) | 15.0 parts |

The application rate of the coating composition was 4.0 g/m² on wet basis.

The properties of the resultant polyester film and the magnetic recording medium prepared by providing a magnetic layer on the first thin film of the above film are shown in Table 1.

Example 10

A reactor was charged with 100 parts of dimethyl terephthalate, 70 parts of ethylene glycol and 0.020 part of manganese acetate tetrahydrate. An ester-interchange reaction was carried out in the reactor whose internal temperature was gradually raised from 145° C. When the ester-interchange reaction ratio reached 95%, 0.044 part of a glycol solution of a phosphorus compound was added as a stabilizer, which solution had been separately prepared by reacting 25 parts of trimethyl phosphate with 75 parts of ethylene glycol in a closed system under reflux for 5 hours and subsequently cooling the reaction product to room temperature. 0.011 Part of a solution (containing 11% by weight of titanium) was further added as a polymerization catalyst, said solution having been prepared through a reaction of 0.8 part of trimellitic anhydride with 0.65 part of tetrabutyl titanate in 2.5 parts of ethylene glycol for 60 minutes in air under normal pressure and subsequent cooling of the system to normal temperature. Five (5) minutes thereafter 0.0092 part of potassium acetate was added. Then the reaction product was transferred to a polymerization vessel and polycondensed under high temperature in vacuo (the final internal temperature of the vessel: 290° C.) to provide a polyethylene terephthalate having an inherent viscosity of 0.60.

The polyethylene terephthalate was melt-extruded and rapidly cooled in an accepted manner to form an unstretched film of 131 μm in thickness. The film was then consecutively biaxially stretched by 3.6× in the longitudinal direction at 90° C. and by 3.7× in the transverse direction at 105° C., followed by 30 seconds of heat-setting at 205° C. Thus, a biaxially oriented film of 9.8 μm in thickness was prepared. In that occasion, to the monoaxially stretched film before the transverse stretching, a coating solution having the following composition was applied onto its film surfaces (A) and (B) by roll coating method. The surface (A) is the one on which the first thin film is to be formed, and on the surface (B) the second thin film is to be formed.

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 80.8 parts |
| 1.5 wt % solution of poly(methyl methacrylate) fine particles ("Epostar MA" produced by Nippon | 4.2 parts |

-continued

| | |
|---|---|
| Shokubai Co., Ltd) (The average diameter of the fine particles was 0.03 μm.) | |
| 1.5 wt % solution of polyoxyethylene nonyl phenyl ether ("NS 240" produced by Nippon Oils and Fats Co., Ltd) | 15.0 parts |

The application rate of the coating composition was 2.7 g/m² on wet basis.

Composition of the coating solution applied onto the film surface (B):

| | |
|---|---|
| 2.0 wt % solution of acryl-polyester resin ("Pesresin SH 551" produced by Takamatsu Oil & Fat Co., Ltd) | 56.7 parts |
| 2.0 wt % solution of cellulosic resin ("Methyl Cellulose SM-15" produced by Shin-etsu Chemical Co., Ltd) | 24.3 parts |
| 2.1 wt % solution of poly(methyl methacrylate) fine particles ("Epostar MA" produced by Nippon Shokubai Co., Ltd) (The average diameter of the fine particles was 0.03 μm.) | 9.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

Properties of the resulting polyester film and the magnetic recording medium prepared by providing a magnetic layer on the first thin film of the above film are shown in Table 1.

Comparative Example 1

Example 1 was repeated except that 0.011 part of the polymerization catalyst solution (containing 11 wt % solution of titanium), which had been prepared by the steps of dissolving 0.8 part of trimellitic anhydride in 2.5 parts of ethylene glycol, adding thereto 0.65 part of tetrabutyl titanate dropwisely, maintaining the system in air under normal pressure to allow the mixture to react for 60 minutes and then cooling it to normal temperature, was changed to 0.040 part of antimony trioxide. The properties of the resulting polyester film and the magnetic recording medium prepared therefrom are shown in Table 2.

Comparative Example 2

Example 1 was repeated except that the composition of the coating solution applied onto the polyester film surface (A) was changed as follows:

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 85.0 parts |
| 1.5 wt % solution of polyoxyethylene nonyl phenyl ether ("NS 240" produced by Nippon Oils and Fats Co., Ltd) | 15.0 parts |

The application rate of the coating composition was 2.7 g/m² on wet basis.

The properties of the polyester film so obtained and the magnetic recording medium prepared therefrom are shown in Table 2.

Comparative Example 3

Example 2 was repeated except that the composition of the coating solution applied onto the polyester film surface (B) was changed as follows:

Composition of the coating solution applied onto the film surface (B):

| | |
|---|---|
| 2.0 wt % solution of acryl-polyester resin ("Pesresin SH 551" produced by Takamatsu Oil & Fat Co., Ltd) | 65.7 parts |
| 2.0 wt % solution of cellulosic resin ("Methyl Cellulose SM-15" produced by Shin-etsu Chemical Co., Ltd) | 24.3 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

The properties of the polyester film so obtained and the magnetic recording medium prepared therefrom are shown in Table 2.

Comparative Example 4

Example 2 was repeated except that the composition of the coating solution applied onto the polyester film surface (B) was changed as follows:

Composition of the coating solution applied onto the film surface (B):

| | |
|---|---|
| 2.0 wt % solution of acryl-polyester resin ("Pesresin SH 551" produced by Takamatsu Oil & Fat Co., Ltd) | 81.0 parts |
| 2.0 wt % solution of poly(methyl methacrylate) fine particles ("Epostar MA" produced by Nippon Shokubai Co., Ltd) | 9.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

The properties of the polyester film so obtained and the magnetic recording medium prepared therefrom are shown in Table 2.

Comparative Example 5

Example 1 was repeated except that the composition of the coating solution applied onto the polyester film surface (A) was changed as follows:

Composition of the coating solution applied onto the film surface (A):

| | |
|---|---|
| 0.13 wt % solution of poly(methyl methacrylate) fine particles ("Epostar MA" produced by Nippon Shokubai Co., Ltd) | 50.0 parts |
| 0.13 wt % solution of polyoxyethylene nonyl phenyl ether ("NS 240" produced by Nippon Oils and Fats Co., Ltd) | 50.0 parts |

The application rate of the coating composition was 2.7 g/m² on wet basis.

The properties of the polyester film so obtained and the magnetic recording medium prepared therefrom are shown in Table 2.

Comparative Example 6

Example 2 was repeated except that the composition of the coating solution applied onto the polyester film surface (B) was changed as follows:

Composition of the coating solution applied onto the film surface (B):

| | |
|---|---|
| 2.0 wt % solution of cellulosic resin ("Methyl Cellulose SM-15" produced by Shin-etsu Chemical Co., Ltd) | 81.0 parts |
| 2.0 wt % solution of poly(methyl methacrylate) fine particles ("Epostar MA" produced by Nippon Shokubai Co., Ltd) | 9.0 parts |
| 2.0 wt % solution of polyoxyethylene nonyl phenyl ether ("NS 208.5" produced by Nippon Oils and Fats Co., Ltd) | 10.0 parts |

The application rate of the coating composition was 4.0 g/m$^2$ on wet basis.

The properties of the polyester film so obtained and the magnetic recording medium prepared therefrom are shown in Table 2.

Comparative Example 7

Example 2 was repeated except that 0.145 part of an ethylene glycol slurry of silicon dioxide having 0.10 μm in an average diameter (10 wt % of silicon dioxide/ethylene glycol slurry) was replaced by 1.0 part of an ethylene glycol slurry of calcium carbonate having 0.8 μm in an average diameter (10 wt % of calcium carbonate/ethylene glycol slurry). The properties of the resultant polyester film and the magnetic recording medium prepared therefrom are shown in Table 2.

Comparative Example 8

Example 1 was repeated except that the composition of the coating solution applied onto the film surface (A) was changed as follows:

Composition of the coating solution applied onto the film surface (A):

| | |
|---|---|
| 15 wt % solution of acryl-polyester resin "Pesresin SH 551" produced by Takamatsu Oil & Fat Co., Ltd | 48.0 parts |
| 15 wt % solution of poly(methyl methacrylate) fine particles ("Epostar MA" produced by Nippon Shokubai Co., Ltd) (The average diameter of the fine particles was 0.07 μm.) | 42.0 parts |
| 15 wt % solution of polyoxyethylene nonyl phenyl ether ("NS 240" produced by Nippon Oils and Fats Co., Ltd) | 10.0 parts |

The application rate of the coating composition was 8.0 g/m$^2$ on wet basis.

The properties of the polyester film so obtained and the magnetic recording medium prepared therefrom are shown in Table 2.

Example 11

Example 3 was repeated except that the composition of the coating solution applied onto the film surface (A) was changed as follows:

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 82.3 parts |
| 1.5 wt % solution of poly(methyl methacrylate) fine particles ("Epostar MA" produced by Nippon Shokubai Co., Ltd) (The average diameter of the fine particles was 0.03 μm.) | 2.7 parts |
| 1.5 wt % solution of polyoxyethylene nonyl phenyl ether ("NS 240" produced by Nippon Oils and Fats Co., Ltd) | 15.0 parts |

The application rate of the coating composition was 2.7 g/m$^2$ on wet basis.

Furthermore, 0.074 part of the ethylene glycol slurry of silicon dioxide having an average particle diameter of 0.08 μm (10 wt % of silicon dioxide/ethylene glycol slurry) was changed to 0.15 part.

The properties of the polyester film so obtained and the magnetic recording medium prepared therefrom are shown in Table 2.

Example 12

Example 2 was repeated except that the composition of the coating solution applied onto the film surface (A) was changed as follows:

Composition of the coating solution applied onto the film surface (A):

| | |
|---|---|
| 1.5 wt % solution of acryl-polyester resin ("Pesresin SH 551" produced by Takamatsu Oil & Fat Co., Ltd) | 81.6 parts |
| 1.5 wt % solution of poly(methyl methacrylate) fine particles ("Epostar MA" produced by Nippon Shokubai Co., Ltd) (The average diameter of the fine particles was 0.03 μm.) | 3.4 parts |
| 1.5 wt % solution of polyoxyethylene nonyl phenyl ether ("NS 240" produced by Nippon Oils and Facts Co., Ltd) | 15.0 parts |

The application rate of the coating composition was 2.7 g/m$^2$ on wet basis.

The properties of the polyester film so obtained and the magnetic recording medium prepared therefrom are shown in Table 2.

TABLE 1

| | Ra | | Number of projections on the first thin film surface (projections/mm$^2$) | Second thin film surface | | Electromagnetic performance of magnetic recording medium | |
|---|---|---|---|---|---|---|---|
| | First thin film thickness (μm) | Second thin film thickness (μm) | | Running durability | | | |
| | | | | μs | Abrasion resistance | Scratch resistance | S/N | Drop ratio |
| Example 1 | 0.002 | 0.004 | 1.1 × 10$^7$ | ○ | ○ | ○ | ○ | ○ |
| Example 2 | 0.002 | 0.004 | 1.1 × 10$^7$ | ○ | ○ | ○ | ○ | ○ |
| Example 3 | 0.002 | 0.004 | 1.1 × 10$^7$ | ○ | ○ | ○ | ○ | ○ |
| Example 4 | 0.002 | 0.004 | 2.0 × 10$^7$ | ○ | ○ | ○ | ○ | ○ |
| Example 5 | 0.002 | 0.004 | 2.0 × 10$^7$ | ○ | ○ | ○ | ○ | ○ |
| Example 6 | 0.002 | 0.004 | 1.1 × 10$^7$ | ○ | ○ | ○ | ○ | ○ |
| Example 7 | 0.003 | 0.006 | 3.0 × 10$^7$ | ○ | ○ | ○ | ○ | ○ |

TABLE 1-continued

| | Ra | | Number of projections on the first thin film surface (projections/mm$^2$) | Second thin film surface | | | Electromagnetic performance of magnetic recording medium | |
|---|---|---|---|---|---|---|---|---|
| | First thin film thickness ($\mu$m) | Second thin film thickness ($\mu$m) | | Running durability | | | | |
| | | | | $\mu$s | Abrasion resistance | Scratch resistance | S/N | Drop ratio |
| Example 8 | 0.002 | 0.005 | 9.6 × 10$^6$ | ○ | ○ | ○ | ○ | ○ |
| Example 9 | 0.002 | 0.005 | 5.0 × 10$^7$ | ○ | ○ | ○ | ○ | ○ |
| Example 10 | 0.002 | 0.004 | 1.1 × 10$^7$ | ○ | ○ | ○ | ○ | ○ |

TABLE 2

| | Ra | | Number of projections on the first thin film surface (projections/mm$^2$) | Second thin film surface | | | Electromagnetic performance of magnetic recording medium | |
|---|---|---|---|---|---|---|---|---|
| | First thin film thickness ($\mu$m) | Second thin film thickness ($\mu$m) | | Running durability | | | | |
| | | | | $\mu$s | Abrasion resistance | Scratch resistance | S/N | Drop ratio |
| Comparative Example 1 | 0.006 | 0.008 | 1.1 × 10$^7$ | ○ | ○ | ○ | X | ○ |
| Comparative Example 2 | 0.002 | 0.004 | none | ○ | ○ | ○ | ○ | ○ |
| Comparative Example 3 | 0.002 | 0.003 | 1.1 × 10$^7$ | X | X | X | ○ | ○ |
| Comparative Example 4 | 0.002 | 0.003 | 1.1 × 10$^7$ | Δ | Δ | X | ○ | ○ |
| Comparative Example 5 | 0.002 | 0.004 | 1.1 × 10$^7$ | ○ | ○ | ○ | ○ | ○ |
| Comparative Example 6 | 0.002 | 0.007 | 1.1 × 10$^7$ | ○ | X | X | ○ | ○ |
| Comparative Example 7 | 0.020 | 0.023 | 1.1 × 10$^7$ | ○ | ○ | ○ | X | X |
| Comparative Example 8 | 0.008 | 0.004 | 2.0 × 10$^9$ | ○ | ○ | ○ | X | X |
| Example 11 | 0.002 | 0.004 | 7.0 × 10$^6$ | ○ | ○ | ○ | ○ | ○ |
| Example 12 | 0.002 | 0.004 | 9.0 × 10$^6$ | ○ | ○ | ○ | ○ | ○ |

Note)
The magnetic recording medium of Comparative Example 2 was inferior in durability characteristics, and that of Comparative Example 5 was inferior in running durability.

Example 13

A reactor was charged with 100 parts of dimethyl terephthalate, 70 parts of ethylene glycol, 0.019 part of manganese acetate tetrahydrate and 0.013 part of sodium acetate trihydrate. An ester-interchange reaction was carried out in the reactor whose internal temperature was gradually raised from 145° C. When the ester-interchange reaction ratio reached 95%, there was added 0.044 part of a glycol solution of a phosphorus compound as a stabilizer, which solution had been separately prepared by reacting 25 parts of trimethyl phosphate with 75 parts of ethylene glycol. 0.011 Part of a solution (containing 11% by weight of titanium) was further added as a polymerization catalyst, said solution having been prepared through a reaction of 0.8 part of trimellitic anhydride with 0.65 part of tetrabutyl titanate in 2.5 parts of ethylene glycol. Thereafter, the reaction product was transferred to a polymerization vessel and polycondensed under high temperature in vacuo (the final internal temperature of the vessel: 290° C.) to provide a polyethylene terephthalate having an inherent viscosity of 0.60.

The polyethylene terephthalate was melt-extruded and rapidly cooled in an accepted manner to form an unstretched film of 131 $\mu$m in thickness. The film was then consecutively biaxially stretched by 3.6× in the longitudinal direction at 90° C. and by 3.7× in the transverse direction at 105° C., followed by 30 seconds of heat-setting at 205° C. Thus, a biaxially oriented film of 9.8 $\mu$m in thickness was prepared. In that occasion, to the monoaxially stretched film before the transverse stretching, a coating solution having the following composition was applied onto its film surfaces (A) and (B) by roll coating method. The surface (A) is the one on which the first thin film is to be formed, and on the surface (B) the film having a slippery surface is to be formed.

Composition of the coating solution applied onto the film surface (A):

| | |
|---|---|
| 0.5 wt % solution of acryl-polyester resin ("Pesresin SH 551" produced by Takamatsu Oil & Fat Co., Ltd) | 39.0 parts |
| 0.5 wt % solution of poly(methyl methacrylate) fine particles ("Epostar MA" produced by Nippon Shokubai Co., Ltd) (The average diameter of the fine particles was 0.03 $\mu$m.) | 11.0 parts |
| 0.5 wt % solution of polyoxyethylene nonyl phenyl ether ("NS 208.5" produced by Nippon Oils and Fats Co., Ltd) | 50.0 parts |

The application rate of the coating composition was 2.0 g/m$^2$ on wet basis.

Composition of the coating solution applied onto the film surface (B):

| | |
|---|---|
| 2.1 wt % solution of acryl-polyester resin ("Pesresin SH 551" produced by Takamatsu Oil & Fat Co., Ltd) | 54.7 parts |
| 2.1 wt % solution of cellulosic resin ("Methyl Cellulose SM-15" produced by Shin-etsu Chemical Co., Ltd) | 24.3 parts |
| 2.1 wt % solution of poly(methyl methacrylate) fine particles ("Epostar MA" produced by Nippon | 9.0 parts |

-continued

| | |
|---|---|
| Shokubai Co., Ltd) (The average diameter of the fine particles was 0.03 μm.) | |
| 2.1 wt % solution of polyoxyethylene nonyl phenyl ether ("NS 208.5" produced by Nippon Oils and Fats Co., Ltd) | 12.0 parts |

The application rate of the coating composition was 4.0 g/m² on wet basis.

Properties of the resulting polyester film and the magnetic recording medium prepared by providing a magnetic layer on the surface (A) side of the film are shown in Table 3.

Example 14

Example 13 was repeated except that 0.145 part of an ethylene glycol slurry of silicon dioxide having 0.10 μm in an average diameter (10 wt % of silicon dioxide/ethylene glycol slurry) was added when the internal temperature in the ester-interchange reaction reached 190° C., and the composition of a coating solution to be applied to the film surface (A) was changed to the following. The properties of the resulting polyester film and a magnetic recording medium prepared therefrom are shown in Table 3.

Composition of the coating solution applied onto the film surface (A):

| | |
|---|---|
| 1.5 wt % solution of polyester resin ("Polyester WR961" produced by Nihon Gosei Kagaku Kogyo K.K.) | 77.3 parts |
| 1.5 wt % solution of poly(methyl methacrylate) fine particles ("Epostar MA" produced by Nippon Shokubai Co., Ltd) (The average diameter of the fine particles was 0.03 μm.) | 7.7 parts |
| 1.5 wt % solution of polyoxyethylene nonyl phenyl ether ("NS 240 " produced by Nippon Oils and Fats Co., Ltd) | 15.0 parts |

The application rate of the coating composition was 2.7 g/m² on wet basis

Example 15

Example 14 was repeated except that the composition of the coating solution to be applied onto the film surface (A) was changed to the following. The properties of the resulting polyester film and a magnetic recording medium prepared therefrom are shown in Table 3.

Composition of the coating solution applied onto the film surface (A):

| | |
|---|---|
| 0.7 wt % solution of polyester resin ("Polyester XWR901" produced by Nihon Gosei Kagaku Kogyo K.K.) | 61.7 parts |
| 0.7 wt % solution of poly(methyl methacrylate) fine particles ("Epostar MA" produced by Nippon Shokubai Co., Ltd) (The average diameter of the fine particles was 0.03 μm.) | 8.3 parts |
| 0.7 wt % solution of polyoxyethylene nonyl phenyl ether ("NS 240" produced by Nippon Oils and Fats Co., Ltd) | 30.0 parts |

The application rate of the coating composition was 2.7 g/m² on wet basis.

Example 16

Example 14 was repeated except that the consecutively biaxially stretched film was heat-set at 225° C. for 30 seconds, and furthermore that the composition of the coating solution to be applied onto the film surface (A) was changed to the following. The properties of the resulting polyester film and a magnetic recording medium prepared therefrom are shown in Table 3.

Composition of the coating solution applied onto the film surface (A):

| | |
|---|---|
| 1.5 wt % solution of acryl-polyester resin ("Pesresin SH 551A" produced by Takamatsu Oil & Fat Co., Ltd) | 84.8 parts |
| 1.5 wt % solution of poly(methyl methacrylate) fine particles ("Epostar MA" produced by Nippon Shokubai Co., Ltd) (The average diameter of the fine particles was 0.03 μm.) | 0.2 parts |
| 1.5 wt % solution of polyoxyethylene nonyl phenyl ether ("NS 240" produced by Nippon Oils and Fats Co., Ltd) | 15.0 parts |

The application rate of the coating composition was 2.2 g/m² on wet basis.

Example 17

A mixture of 100 parts of bis-β-hydroxyethyl terephthalate, 65 parts of terephthalic acid and 29 parts of ethylene glycol was subjected to an esterification reaction at 210° to 230° C. At the point when the amount of distilled water formed in the reaction reached 13 parts, the reaction was terminated, and 0.0067 part of titanium acetate per 100 parts of the reaction product was added to the system. Then the reaction product was transferred to a polymerization vessel. Through subsequent polycondensation reaction under high temperature in vacuo (final internal temperature: 285° C.), a polyethylene terephthalate having an inherent viscosity of 0.60 was obtained.

This polyethylene terephthalate was melt-extruded and rapidly cooled to form an unstretched film of 131 μm in thickness in the accepted manner, which film was then consecutively biaxially stretched by 3.6× in the longitudinal direction at 90° C. and by 3.7× in the transverse direction at 105° C., followed by 30 seconds of heat-setting at 205° C. Thus, a biaxially oriented film of 9.8 μm in thickness was prepared. In that occasion, to the monoaxially stretched film before the transverse stretching, a coating solution having the following composition was applied onto its surfaces (A) and (B) by roll coating method. The surface (A) is the one on which the first thin film is to be formed, and on the other surface (B) the film having a slippery surface is to be formed.

Composition of the coating solution applied onto the film surface (A):

| | |
|---|---|
| 1.5 wt % solution of polyester resin ("Plascoat RZ-358" produced by Gooh Chemical Ind. Co., Ltd) | 41.0 parts |
| 1.5 wt % solution of polyester resin ("Polyester WR 961" produced by Nihon Gosei Kagaku Kogyo K.K.) | 41.3 parts |
| 1.5 wt % solution of poly(methyl methacrylate) fine particles ("Epostar MA" produced by Nippon Shokubai Co., Ltd) (The average diameter of the fine particles was 0.023 μm.) | 2.7 parts |

-continued

| | |
|---|---|
| 1.5 wt % solution of polyoxyethylene nonyl phenyl ether ("NS 240" produced by Nippon Oils and Fats Co., Ltd) | 15.0 parts |

The application rate of the coating composition was 2.7 g/m² on wet basis.

Composition of the coating solution applied onto the film surface (B):

| | |
|---|---|
| 2.1 wt % solution of acryl-polyester resin ("Pesresin SH 551A" produced by Takamatsu Oil & Fat Co., Ltd) | 56.7 parts |
| 2.1 wt % solution of cellulosic resin ("Methyl Cellulose SM-15" produced by Shin-etsu Chemical Co., Ltd) | 24.3 parts |
| 2.1 wt % solution of poly(methyl methacrylate) fine particles ("Epostar MA" produced by Nippon Shokubai Co., Ltd) (The average diameter of the fine particles was 0.035 μm.) | 9.0 parts |
| 2.1 wt % solution of polyoxyethylene nonyl phenyl ether ("NS 208.5" produced by Nippon Oils and Fats Co., Ltd) | 10.0 parts |

The application rate of the coating composition was 4.1 g/m² on wet basis.

The properties of the resultant polyester film and the magnetic recording medium prepared by providing a magnetic layer on the film surface (A) side are shown in Table 3.

Example 18

To a mixture of 100 parts of dimethyl-2,6-naphthalene dicarboxylate and 60 parts of ethylene glycol, 0.021 part of manganese salicylate and 0.005 part of potassium acetate were added. After further addition of 0.007 part of titanium oxalate, an ester-interchange reaction was carried out, while the temperature was raised gradually from 150° C. to 240° C. When the ester-interchange reaction ratio reached 93%, 0.032 part of a liquid mixture having a liquid temperature of 140° C. was added as a stabilizer, said liquid mixture having been prepared by an advance and separate reaction of 25 parts of trimethyl phosphate with 75 parts of ethylene glycol. 0.200 Part of an ethylene glycol slurry of silicon dioxide of an average particle diameter 0.010 μm (10 wt %) was further added. Then the reaction product was transferred into a polymerization vessel, where polycondensation of the system was carried out under high temperature in vacuo (final inside temperature: 280° C.). Thus, a polyethylene-2,6-naphthalate having an inherent viscosity of 0.57 was obtained.

This polyethylene-2,6-naphthalate was melt-extruded and rapidly cooled in the accepted manner to form an unstretched film of 78 μm in thickness, which was consecutively biaxially stretched by 4.0× in the longitudinal direction at 135° C. and by 5.0× in the transverse direction at 145° C., followed by 30 seconds of heat-setting at 210° C. Thus a biaxially oriented film of 4.0 μm in thickness was prepared. In that occasion, to the monoaxially stretched film before the transverse stretching, a coating solution of the following composition was applied onto its film surfaces (A) and (B) by roll coating method. The surface (A) is the one on which the first thin film is to be formed, and on the surface (B) the film having a slippery surface is to be formed.

Composition of the coating solution applied onto the film surface (A):

| | |
|---|---|
| 0.7 wt % of polyester resin ("Polyester WR 961" produced by Nihon Gosei Kagaku Kogyo K.K.) | 35.0 parts |
| 0.7 wt % solution of acryl-polyester resin ("Pesresin SH 551A" produced by Takamatsu Oil & Fat Co., Ltd) | 32.5 parts |
| 0.7 wt % solution of colloidal silica ("Cataloid-SI 350" produced by Catalysts & Chemicals Industries Co., Ltd) | 2.5 parts |
| 0.7 wt % solution of polyoxyethylene nonyl phenyl ether ("NS 240" produced by Nippon Oils and Fats Co., Ltd) | 30.0 parts |

The application rate of the coating composition was 3.6 g/m² on wet basis.

Composition of the coating solution applied onto the film surface (B):

| | |
|---|---|
| 2.8 wt % solution of acryl-polyester resin ("Pesresin SH 551A" produced by Takamatsu Oil & Fat Co., Ltd) | 54.7 parts |
| 2.8 wt % solution of cellulosic resin ("SM-15" produced by Sin-etsu Chemical Co., Ltd) | 24.3 parts |
| 2.8 wt % solution of colloidal silica ("Cataloid-SI 350" produced by Catalysts & Chemicals Industries Co., Ltd) | 11.0 parts |
| 2.8 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

The properties of the resulting polyester film and the magnetic recording medium prepared by providing a magnetic layer on the first thin film of the above film are shown in Table 3.

Example 19

A reactor was charged with 100 parts of dimethyl terephthalate, 70 parts of ethylene glycol and 0.019 part of manganese acetate tetrahydrate. An ester-interchange reaction was carried out in the reactor whose internal temperature was gradually raised from 145° C. When the ester-interchange reaction ratio reached 90%, 0.013 part of sodium acetate trihydrate was added, and the ester-interchange reaction was continued. Further, when the ester-interchange reaction ratio reached 95%, 0.044 part of a glycol solution of a phosphorus compound was added as a stabilizer, which solution had been separately prepared by reacting 25 parts of trimethyl phosphate with 75 parts of ethylene glycol. 0.011 Part of a solution (containing 11 wt % of titanium) was further added as a polymerization catalyst, said solution having been prepared through a reaction of 0.8 part of trimellitic anhydride with 0.65 part of tetrabutyl titanate in 2.5 parts of ethylene glycol. Thereafter the reaction product was transferred to a polymerization vessel and polycondensed under high temperature in vacuo (the final internal temperature of the vessel: 290° C.) to provide a polyethylene terephthalate (A) having an inherent viscosity of 0.60.

A reactor was charged with 100 parts of dimethyl terephthalate, 70 parts of ethylene glycol and 0.040 part of manganese acetate tetrahydrate. An ester-interchange reaction was carried out in the reactor whose internal temperature was gradually raised from 145° C. When the ester-interchange reaction ratio reached 97%, 0.100 part of a glycol solution of a phosphorus compound was added as a stabilizer, which solution had been separately prepared through the reaction between 25 parts of trimethyl phosphate and 75 parts of ethylene glycol. 0.011 Part of a solution (containing 11 wt % of titanium) was further added as a polymerization catalyst, said solution having been prepared through a reaction of 0.8 part of trimellitic anhydride with 0.65 part of tetrabutyl titanate in 2.5 parts of ethylene glycol. Furthermore, five (5) minutes thereafter 0.15 part of calcium carbonate having 0.30 μm in an average particle diameter was added. Thereafter, the reaction product was transferred to a polymerization vessel and polycondensed under high temperature in vacuo (the final internal temperature of the vessel: 290° C.) to provide a polyethylene terephthalate (B) having an inherent viscosity of 0.65.

These polyethylene terephthalates (A) and (B) were melted and co-extruded at a thickness ratio of 6:4, and rapidly cooled to form an unstretched film of 96 μm in thickness. The film was then consecutively biaxially stretched by 3.6× in the longitudinal direction at 95° C. and by 3.7× in the transverse direction at 110° C., followed by 30 seconds of heat-setting at 205° C. Thus, a biaxially oriented film of 7.1 μm in thickness was prepared. In that occasion, to the monoaxially stretched film before the transverse stretching, coating solutions having the following compositions were applied onto the outer surfaces of polyethylene terephthalates (A) and (B) by roll coating method.

Composition of the coating solution applied onto the outer surface of the polyethylene terephthalate (A):

| | |
|---|---|
| 1.5 wt % solution of polyester resin ("TK set 113B" produced by Takamatsu Oil & Fat Co., Ltd) | 80.0 parts |
| 1.5 wt % solution of colloidal silica ("Snowtex 30" produced by Nissan Chemical Industries, Ltd) | 5.0 parts |
| 1.5 wt % solution of polyoxyethylene nonyl phenyl ether ("NS 208.5" produced by Nippon Oils and Fats Co., Ltd) | 15.0 parts |

The application rate of the coating composition was 2.7 g/m² on wet basis.

Composition of the coating solution applied onto the outer surface of the polyethylene terephthalate (B):

| | |
|---|---|
| 2.1 wt % solution of acryl-polyester resin ("Pesresin SH 551A" produced by Takamatsu Oil & Fat Co., Ltd) | 54.7 parts |
| 2.1 wt % solution of cellulosic resin ("Methyl Cellulose SM-15" produced by Shin-etsu Chemical Co., Ltd) | 24.3 parts |
| 2.1 wt % solution of colloidal silica ("Cataloid SI-350" produced by Catalysts & Chemicals Co., Ltd) | 11.0 parts |
| 2.1 wt % solution of polyoxyethylene nonyl phenyl ether ("NS 208.5" produced by Nippon Oils and Fats Co., Ltd) | 10.0 parts |

The application rate of the coating composition was 4.0 g/m² on wet basis.

The properties of the resultant polyester film and the magnetic recording medium prepared by providing a magnetic layer on the surface of polyethylene terephthalate (A) of this film are shown in Table 3.

Comparative Example 9

Example 14 was repeated except that the composition of the coating solution applied onto the film surface (A) was changed to the following to form a polyester film and a magnetic recording medium. The properties of these products are shown in Table 3.

Composition of the coating solution applied onto the film surface (A):

| | |
|---|---|
| 15.0 wt % solution of acryl-polyester resin ("Pesresin SH 551A" produced by Takamatsu Oil & Fat Co., Ltd) | 58.0 parts |
| 15.0 wt % solution of poly(methyl methacrylate) fine particles ("Epostar MA" produced by Nippon Shokubai Co., Ltd) (The average diameter of the fine particles was 0.02 μm.) | 27.0 parts |
| 15.0 wt % solution of polyoxyethylene nonyl phenyl ether ("NS 240" produced by Nippon Oils and Fats Co., Ltd) | 15.0 parts |

The application rate of the coating composition was 5.0 g/m² on wet basis.

Comparative Example 10

Example 14 was repeated except that the composition of the coating solution applied onto the film surface (A) was changed to the following to form a polyester film and a magnetic recording medium. The properties of these products are shown in Table 3.

| | |
|---|---|
| 0.5 wt % solution of acryl-polyester resin ("Pesresin SH 551A" produced by Takamatsu Oil & Fat Co., Ltd) | 49.9989 parts |
| 0.5 wt % solution of poly(methyl methylcrylate) fine particles ("Epostar MA" produced by Nippon Shokubai Co., Ltd) (The average diameter of the fine particles was 0.03 μm.) | 0.0011 part |
| 0.5 wt % solution of polyoxyethylene nonyl phenyl ether ("NS 240" produced by Nippon Oils and Fats Co., Ltd) | 50.0 parts |

The application rate of the coating composition was 2.0 g/m² on wet basis.

Comparative Example 11

Example 14 was repeated except that the composition of the coating solution applied onto the film surface (A) was changed to the following to form a polyester film and a magnetic recording medium. The properties of these products are shown in Table 3.

Composition of the coating solution applied onto the film surface (A):

| | |
|---|---|
| 5.0 wt % solution of acryl-polyester resin ("Pesresin SH 551A" produced by Takamatsu Oil & Fat Co., Ltd) | 84.3 parts |
| 5.0 wt % solution of poly(methyl methacrylate) fine particles ("Epostar MA" produced by Nippon Shokubai Co., Ltd) (The average diameter of the fine particles was 0.03 μm.) | 0.7 part |
| 5.0 wt % solution of polyoxyethylene nonyl phenyl ether ("NS 240" produced by Nippon Oils and Fats Co., Ltd) | 15.0 parts |

The application rate of the coating composition was 3.0 g/m² on wet basis.

Comparative Example 12

Example 14 was repeated except that the composition of the coating solution applied onto the film surface (A) was changed to the following to form a polyester film and a magnetic recording medium. The properties of these products are shown in Table 3.

Composition of the coating solution applied onto the film surface (A):

| | |
|---|---|
| 15 wt % solution of acryl-polyester resin ("Pesresin SH 551A" produced by Takamatsu Oil & Fat Co., Ltd) | 80.0 parts |
| 15 wt % solution of polyoxyethylene nonyl phenyl ether ("NS 240" produced by Nippon Oils and Fats Co., Ltd) | 20.0 parts |

The application rate of the coating composition was 5.0 g/m² on wet basis.

Comparative Example 13

Example 14 was repeated except that 0.145 part of the ethylene glycol slurry of silicon dioxide having an average particle diameter 0.10 μm (10 wt % of the silicon dioxide/ethylene glycol slurry) to be added at the time when the internal temperature in the ester-interchange reaction reached 190° C., was changed to 1.0 part of an ethylene glycol slurry of calcium carbonate having an average particle diameter 0.8 μm (10 wt % of the calcium carbonate/ethylene glycol slurry) at the time when said temperature reached 195° C., to form a polyester film and a magnetic recording medium. The properties of these products are shown in Table 3.

having a weight per unit area of 0.001 to 1 g/m² and being composed of a composition consisting essentially of:

(A1) a first binder resin, wherein the first binder resin (A1) in the first continuous film (2) is at least one resin selected from the group consisting of acryl-polyester resin, and a comination of saturated polyester resin and acrylic resin, and (B1) first fine particles having an average particle diameter of not greater than 0.1 μm, and having on its surface (C1) first projections derived from said first fine particles at the number of $1.0 \times 10^4$ to $1.0 \times 10^9$ projections/mm², and the surface roughness being 0.001 to 0.01 μm in terms of center line average roughness, and (3) a second continuous film provided on the other surface of said base film, which forms a surface with a frictional coefficient of 0.6 or less, said second continuous film being composed of a composition consisting essentially of:

(A2) a second binder resin, wherein the second binder resin (A2) of the second continuous thin film (3) is selected from the group consisting of acryl-polyester resin, and a combination of saturated polyester resin and acrylic resin, (A3) a cellulosic resin, wherein the cellulosic resin (A3) is selected from the group consisting of ethyl

TABLE 3

| | Evaporation deposited surface characteristics | | | | | Running durability | | Magnetic recording medium | | | |
|---|---|---|---|---|---|---|---|---|---|---|---|
| | Projections formed of particles as nuclei (projections/mm²) | Projections formed of resin only (projections/mm²) | Surface roughness (μm) | Surface roughness of slippery surface (μm) | Film frictional coefficient | Abrasion resistance | Scratch resistance | S/N | Output drop ratio | Running property | Scratch resistance |
| Ex. 13 | 7 × 10⁶ | 2 × 10³ | 0.002 | 0.004 | ○ | ○ | ○ | ○ | ○ | ○ | ○ |
| Ex. 14 | 2 × 10⁷ | 5 × 10⁴ | 0.002 | 0.004 | ○ | ○ | ○ | ○ | ○ | ○ | ⊚ |
| Ex. 15 | 1 × 10⁷ | 7 × 10³ | 0.002 | 0.004 | ○ | ○ | ○ | ○ | ○ | ○ | ⊚ |
| Ex. 16 | 4 × 10⁵ | 3 × 10⁶ | 0.001 | 0.004 | ○ | ○ | ○ | ○ | ○ | ○ | ○ |
| Ex. 17 | 1.5 × 10⁷ | 8 × 10⁵ | 0.002 | 0.005 | ○ | ○ | ○ | ○ | ○ | ○ | ⊚ |
| Ex. 18 | 8 × 10⁵ | 6 × 10³ | 0.002 | 0.003 | ○ | ○ | ○ | ○ | ○ | ○ | ○ |
| Ex. 19 | 2 × 10⁷ | 2 × 10⁴ | 0.002 | 0.008 | ○ | ○ | ○ | ○ | ○ | ○ | ⊚ |
| Comp. Ex. 9 | 9 × 10⁸ | 5 × 10⁸ | 0.003 | 0.004 | ○ | Δ | ○ | X | X | ○ | ○ |
| Comp. Ex. 10 | 6 × 10² | 3 × 10³ | 0.002 | 0.004 | Δ | ○ | X | ○ | ○ | X | X |
| Comp. Ex. 11 | 8 × 10⁶ | 4 × 10⁷ | 0.002 | 0.004 | ○ | ○ | ○ | X | X | ○ | ○ |
| Comp. Ex. 12 | none | 6 × 10⁸ | 0.002 | 0.004 | Δ | ○ | X | X | X | X | X |
| Comp. Ex. 13 | 2 × 10⁷ | 5 × 10⁴ | 0.015 | 0.015 | ○ | ○ | ○ | X | X | ○ | ⊚ |

We claim:

1. A magnetic recording medium formed by providing a magnetic recording layer on the surface of a first film of a biaxially oriented polyester film, which is composed of:

(1) a biaxially oriented base film of aromatic polyester prepared by use of an organotitanium compound as the polymerization catalyst, wherein the aromatic polyester (1) is substantially linear and saturated, and is obtained through polycondensation of an aromatic dibasic acid or an ester-forming derivative thereof, with an aliphatic diol or an ester-forming derivative thereof, (2) a first continuous film provided on one of the surfaces of said base film, on which the magnetic recording layer is formed, said first continuous film cellulose, methyl cellulose, acetyl cellulose, acetoacetyl cellulose, nitrocellulose, carboxylated cellulose, carboxy-methyl cellulose and cellulose acetate butyrate, and (B2) second fine particles having an average particle diameter not greater than 0.15 μm, and having (C2) a surface roughness of 0.002 to 0.01 μm in terms of center line average roughness.

2. A magnetic recording medium set forth in claim 1, wherein the first continuous thin film (2) contains 45 to 99.9% by weight of the first binder resin (A1) and 0.1 to 55% by weight of the first fine particles (B1), based on the total weight of the first binder resin (A1) and the first fine particles (B1).

3. A magnetic recording medium set forth in claim 1, wherein the second continuous film (3) consists essentially of 30 to 85% by weight of the second binder resin, 10 to 50% by weight of the cellulosic resin and 5 to 30% by weight of the second fine particles (B2), based on the total weight of the second binder resin (A2), cellulosic resin (A3) and the second fine particles (B2).

4. A magnetic recording medium formed by providing a magnetic recording layer on the surface of a first film of a biaxially oriented polyester film, which is composed of:

(1) a biaxially oriented base film of aromatic polyester prepared by use of an organotitanium compound as the polymerization catalyst, (2) a first continuous film provided on one of the surfaces of said base film, on which the magnetic recording layer is formed, said first continuous film having a weight per unit area of 0.001 to 1 $g/m^2$ and being composed of a composition consisting mainly of:

(A1) an acryl-polyester resin, and (B1) first fine particles having an average particle diameter of not greater than 0.1 $\mu m$, and having on its surface (C1) first projections derived from said first fine particles at the number of $1.0 \times 10^4$ to $1.0 \times 10^9$ projections/$mm^2$, and the surface roughness being 0.001 to 0.01 $\mu m$ in terms of center line average roughness, and (3) a second continuous film provided on the other surface of said base film, which forms a surface with a frictional coefficient of 0.6 or less, said second continuous film being composed of a composition consisting mainly of:

(A2) an acryl-polyester resin, (A3) a cellulosic resin, and (B2) second fine particles having an average particle diameter not greater than 0.15 $\mu m$, and having (C2) a surface roughness of 0.002 to 0.01 $\mu m$ in terms of center line average roughness.

* * * * *